Feb. 23, 1965     W. L. KOLTUN     3,170,246
SPACE FILLING ATOMIC UNITS AND CONNECTORS FOR MOLECULAR MODELS
Filed Feb. 23, 1962
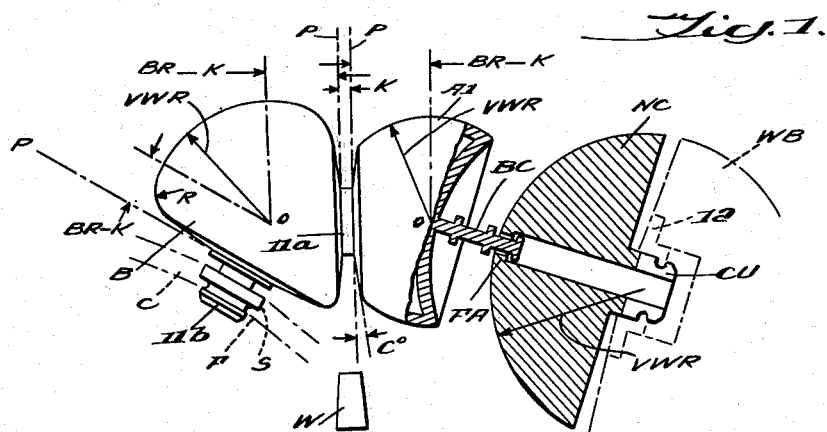
Fig. 1.
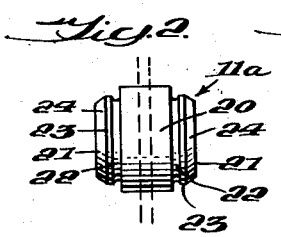 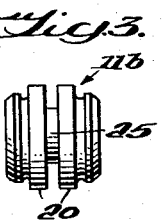 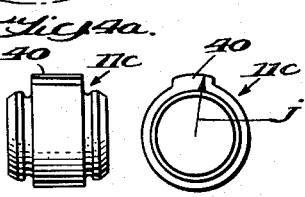
Fig. 2.   Fig. 3.   Fig. 4a.   Fig. 4b.
Fig. 5a.
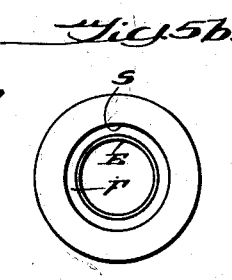 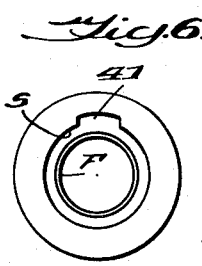 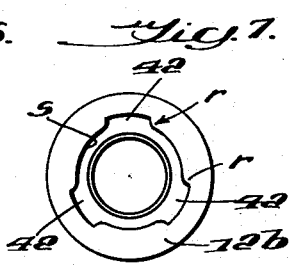
Fig. 5b.   Fig. 6.   Fig. 7.
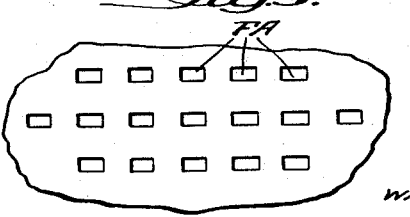
Fig. 8.   Fig. 9.
INVENTOR.
WALTER L. KOLTUN,
BY
ATTORNEY

United States Patent Office 3,170,246
Patented Feb. 23, 1965

3,170,246
SPACE FILLING ATOMIC UNITS AND CONNECTORS FOR MOLECULAR MODELS
Walter L. Koltun, Washington, D.C., assignor to the United States of America as represented by the Secretary of the Department of Health, Education, and Welfare
Filed Feb. 23, 1962, Ser. No. 186,287
3 Claims. (Cl. 35—18)
(Granted under Title 35, U.S. Code (1952), sec. 266)

This invention relates to molecular models and aims generally to improve the same. It aims particularly, but not exclusively, to provide new and improved space filling atom units and connectors having improved cooperation with one another and assemblable to produce improved three dimensional molecular models, especially of macromolecules, for facilitating the study and visualization of the detailed space relationships and manipulations possible in the structures thereof.

In recent years increasing concern has been expressed by many scientists at the lack of accurate, inexpensive atomic and molecular models, suitable for use in research and training in the biochemical and biophysical sciences. The need for such models has been well stated by J. R. Platt in Science, vol. 131, page 1309 (1960) as follows:

"Many of the most important current theories of biological structure and function at the molecular level depend upon detailed space relationships between atoms in macromolecules. These include theories of DNA (deoxyribonucleic acid) structure, of protein synthesis and structure, of enzyme action and of antigen-antibody relationships. These theories are hard for anyone to understand in quantitative detail unless he has a three-dimensional mechanical model of the molecules to look at and manipulate. Unfortunately, the present commercial models—which are excellent for representing small molecules and which have contributed tremendously to organic and inorganic chemical progress at the research level as well as at the teaching level—are unsatisfactory for these large biological molecules. As big molecule models they are expensive, clumsy and badly connected, and frequently fail to represent correctly, according to our best current knowledge, some of the essential structures such as peptide bonds and aromatic rings. As a result the advanced research laboratories in molecular biology commonly make their own macromolecular models in their own shops, often at a cost of thousands of dollars for so elementary a model as a single turn of a DNA double helix. It follows that many laboratories and many good research minds outside these few centers are essentially excluded from participation in detailed discussion of biochemical structural problems, and the new developments are more difficult to teach or to explain than they ought to be."

It may be added that not only are molecular models necessary to the understanding of many theories of biological structure and function, but that from such models may come new theories. It is important to recognize that while the greatest use for atomic models may reside in the biological sciences, polymer and organic chemistry also benefit therefrom.

Space-filling molecular model units heretofore available have distinct deficiences. Some utilize metal snaps which tend to open in the construction of large molecules. They make no adequate provision for flexibility or for varying the bond angle. They provide no means for representing the concept of rotational potential.

The present invention has been made in an endeavor to satisfy the long felt need for improved molecular models overcoming various ones of these disadvantages. Broadly, it aims to provide a structure facilitating the attaining of as many of the following desiderata as possible:

(A) Accuracy of bond angles, covalent radii, and Van der Waal's radii.

(B) A structure capable of being produced at a cost reduction of 90% or so of heretofore available models.

(C) A density as low as possible, consistent with strength and other requirements, and preferably less than 1.0 for the molecule as a whole.

(D) A scale sufficiently large to avoid sacrifice of accuracy and excessive cost of production, and capable of affording reasonable size and sufficient detail without being cumbersome.

(E) Connector means sufficiently strong to support the weight of a large number of atom units (hereinafter sometimes called atoms for brevity), say at least fifty thereof, with negligible angular distortion, say less than 3°, and yet flexible enough to allow adequate bond angle variation, say over an angle of 8°, with no significant loss of bond strength.

(F) Provisions which will allow the bond distance to be shortened or lengthened in accordance with observed data, for obviating need for increasing the variety of atom units employed.

(G) Units satisfactorily embodying the concept of rotational potential, so as to appropriately represent the conditions met with because of the fact that tetrahedral carbon-carbon bonds, for example, do not have free rotation in nature.

(H) A structure enabling a representation in an effective manner of the hydrogen bond so prevalent in biomacromolecules.

(I) The provision of suitable structures for representing special atoms, models of which are not used with sufficient frequency to warrant mass production thereof, but which are nonetheless important, so that such may be appropriately assembled with the mass produced atom units, herein sometimes called standard atoms for brevity.

The manners in which these and other objects and advantages of the invention are attained will become evident from the following description of preferred embodiments of the invention, which are to be taken as illustrative, and not restrictive thereof. The invention resides in the novel features and combinations of parts hereinafter described and is more particularly pointed out in the appended claims.

In the accompanying drawings of illustrative embodiments of the invention:

FIG. 1 is a somewhat diagrammatic elevation, partly in section, of a portion of an illustrative assemblage of atom units and the connectors exemplifying a molecular structure having a covalent bond, a flexible covalent bond, and a hydrogen bond;

FIGS. 2, 3 and 4a are side elevations of three forms of connector element, FIG. 4b being an end elevation of the form of FIG. 4a;

FIGS. 5a and 5b are section and elevation views of one form of atom unit connector socket, and FIGS. 6 and 7 are elevations of two additional forms;

FIG. 8 is an elevation of a single bond hydrogen unit; and

FIG. 9 is a developed plan of a set of hydrogen bond female connecting elements of the type employable in the spherical surfaces of units representing atoms to which hydrogen bonding may occur, i.e. oxygen, nitrogen and fluorine atoms.

In accordance with the present invention, there are certain basic factors which are preferably built into the molecular models and the components thereof, namely:

(1) The atom units are formed to represent the Van der Waal's radii of the represented atoms, and their bond radii, to suitable scale; the preferred scale being a scale of 1.25 centimeters per angstrom unit. Thus a "scalar angstrom unit" in models constructed to this preferred scale is approximately 0.492 inch long. This scale is preferred as it appears to offer the best compromise when factors of cost, accuracy, and the construction of macro-molecules of reasonable size and adequate detail are considered. With this preferred scale a molecule 20 by 40 by 100 angstroms in size is represented by a scalar angstrom model occupying 25 by 50 by 125 centimeters. While smaller and larger scaler angstroms may be used, with the former accuracy is sacrificed and cost increased by greater difficulty of construction; and with the latter the models become more cumbersome.

(2) The atom units generally are made hollow, and of molded plastic material, which results in a low weight per atom, e.g. between 4 and 8 grams.

(3) All atom units are made substantially rigid except that of single bonded hydrogen, which is preferably made elastically deformable or compressible. Hydrogen bonded hydrogen, which is conceived of as held rather rigidly by being bonded between two atoms at least one of which is from the group consisting of oxygen, nitrogen and fluorine, is correspondingly formed as a rigid unit in accordance with this invention; and special connecting means is provided for representing the hydrogen bond, by appropriately providing the hydrogen atom unit with a spherical indentation about an appropriately spaced center corresponding in scalar angstroms radius to the Van der Waal's radius of oxygen or nitrogen, providing the said indentation with a centrally projecting arrow barb (which need not extend beyond the projected Van der Waal's radius of the hydrogen unit) and providing appropriate oxygen, and/or nitrogen and/or fluorine atom units having on their spherical surfaces appropriately positioned female fastener elements, preferably rectangular holes, with which the arrow barbs may selectively cooperate. The axis of the said arrow barb and indentation may be oriented for representing linear or non-linear hydrogen bonding, and the barb element preferably comprises a plurality of barb or T-head member spaced along said axis and selectably lockable with the cooperating female fastening element for lengthening or shortening the representation of the hydrogen bond.

(4) The atom units themselves are respectively formed about the centers of inscribing spheres of the appropriate Van der Waal's radius in scalar angstroms, which spheres are truncated normal to the respective bond axes at distances from the centers of the spheres corresponding to the normal bond radii concerned, less a constant factor equal to a small percentage of a bond radius, and preferably standardized at about 0.05 scalar angstrom units. Coaxial with the normal bond radii the units are provided with flexible inter-connecting means, preferably comprising rubbery male headed connector elements entering cooperating sockets in the respective atom units. The faces of the atom units surrounding such sockets are spaced apart sufficiently to permit limited flexure of the said interconnecting means, preferably being relieved at a conical angle of about 4° from the flat plane, to permit rocking through an angle of about plus or minus 8° while still maintaining the conical faces of the units in closely spaced relation, especially adjacent the interconnecting means.

(5) By arrangements hereinafter exemplified, adequate provision is made to prevent the atoms from separating readily, and in the illustrative embodiment the detachable connections are sufficiently strong to support fifty or more units with a very small, say less than 3°, angular distortion, and yet are flexible enough to permit the aforesaid variation of bond angles up to plus or minus 8° without loss of effective bond strength. Preferably, as in the illustrative construction, a pull of at least 10 lbs. in a direct line is required to effect a separation of the assembled atoms.

(6) Also by special provisions, the models are made to adequately represent the concept of rotational potential, e.g. free rotation of certain bonds, and restriction of rotation about other bonds in various ways, also without loss of effective bond strength.

(7) In the preferred arrangements the units are so formed that when assembled into molecular models all or nearly all of the atom units are completely closed, thus trapping air therein and rendering them buoyant in the event it is desired to float them in or on a liquid, e.g. water, for study and manipulation.

(8) Also in preferred embodiments certain atoms may be provided with modifying caps for covering one or more of the truncated faces with a body essentially filling it out to the full scalar Van der Waal's radius of the represented atom, thus to reduce the number of different forms of atoms required for a comprehensive set; and interconnecting elements are preferably provided which may comprise female socket members adapted to be used for the occasional construction of special atoms which are not used in sufficient volume to warrant mass production thereof, so that such may be used in combination with the standard atoms and connecting means of a set.

One skilled in the art of course will appreciate that the atoms of different elements, while in each instance confined within an inscribing sphere of scalar Van der Waal's radius, will take different characteristic forms or shapes within such boundaries, depending on the atoms represented, which shapes may be roughly characterized, for ease of visualization of representative types of atoms, as set forth in Table I, herewith:

TABLE I

"Style" characterization of various representative atoms

| Style | Atom represented | Nature of socket(s) |
|---|---|---|
| A. Mushroom head | (1) Single-bond hydrogen [1] | No-lock. |
|  | (2) Double-bond oxygen | Lock. |
|  | (3) Same, indented | Do. |
|  | (4) Halogens | No-lock. |
| B. 2-faced wedge | (5) Single-bond oxygen | Both lock. |
|  | (6) Digonal sulfur | Neither locks. |
| C. 3-faced prism | (7) Ethylenic carbon [2] | Double-bond locks. |
|  | (8) Aromatic nitrogen for 5-membered rings. | Ring bonds lock. |
|  | (9) Aromatic nitrogen for 6-membered rings. | Ring bonds lock. |
|  | (10) Aromatic carbons for 6-membered rings. | Ring bonds lock. |
|  | (11) Special carbon for 5-membered ring. |  |
|  | (12) Amide nitrogen [3] | All lock. |
|  | (13) Amide carbon | Do. |
| D. 4-faced tetrahedral | (14) Tetrahedral-N [4] | None lock. |
|  | (15) Tetrahedral-C | All restrain. |
|  | (16) Tetrahedral-P | None lock. |
| E. 6-faced cubical | (17) Metal atoms for chelates. | Do. |
| F. 2-parallel faced | (18) Acetylenic carbon [5] | Triple bond locks. |

[1] Illustrated in Fig. 8. At least the spherical head of single bond hydrogen is preferably made elastically deformable. For hydrogen-bond hydrogens the mushroom head may be indented linearly or at 17° angle and provided with arrow-barb connector as illustrated in Fig. 1.

[2] Single-bond faces preferably relieved at greater (say 10°) conical angle to more clearly externally distinguish from double-bond face.

[3] Will also serve as general planar-N, e.g. trigonal-N; N in NO₂; and with caps as azo–N.

[4] Tetrahedral-N may be used as aromatic-N by covering one of its faces with a cap member (NC Fig. 1) which substitutes for that face a spherical surface provided with a hydrogen-bond socket.

[5] Triple-bond face preferably made flat instead of conically relieved, to more clearly externally distinguish from single bond face.

In the accompanying drawings it of course is neither desirable nor necessary to set forth examples of all the various multi-faced forms of atoms, and it will be recognized that FIG. 8 (showing a single bonded hydrogen atom A) is typical of the mushroom head form; that the central atom A1 in FIG. 1 is typical of the special hydrogen atoms; that the atom B wholly in elevation in FIG. 1 is typical of the multifaced atoms of forms B through F; and that the unit NC wholly in section in FIG. 1 is typical of the nitrogen cap above mentioned.

From the foregoing it will be appreciated that within the set of atom units and connectors, the single bonded hydrogen atom A is unique, since it is preferably elastically deformable to represent the ability of single bonded hydrogens in actual molecules to seemingly accommodate themselves to the presence of other atoms in such proximity that conflict would occur absent such accommodation. Since the single bonded hydrogens A are thus made of elastic material in the preferred practice of the invention, and since it is desired that the atom unit interconnecting means be elastically resilient, it is preferred, as shown in FIG. 8, to make the connector element 11a for the single bonded hydrogen hollow and integral with the hollow elastic hydrogen atom unit. In all other atoms, including the hydrogen bonded hydrogen, the atom body is substantially rigid, and accordingly, the resilient interconnecting elements 11a–11c for all other atoms are preferably made separate therefrom. In the case of the "nitrogen" cap, the only requirement is that it be satisfactorily secured to the adjacent nitrogen (or oxygen) atom. Hence, as shown in FIG. 1, this "cap" NC may be formed of any suitable material with either a separate connector unit or an integral connector unit cu, which may be made like the number 11, or of less elastic material slotted for flexibility as indicated at cu in FIG. 1.

Referring in more detail to FIG. 1, there is there shown a rigid hollow multifaced space-filling atom B, having either secured in, or integral with, its respective faces female connector and socket elements as exemplified in FIGS. 5a to 7. Engaged in said socket elements are resilient male-ended interconnecting links 11a and 11b, hereinafter more fully described in connection with FIGS. 2 to 4b. To these links 11a and 11b are attached further atom units having cooperating socket and female connector units, exemplified by the non-linear hydrogen-bonded hydrogen unit A1 engaged with connector 11a and by the rigid atom unit C (indicated in phantom) engaged with connector 11b.

As is illustrated in FIGS. 1 and 8, each atom unit is developed about the center 0 of an inscribing spherical volume of a radius corresponding in scalar angstrom units to the Van der Waal's radius of the atom concerned, as indicated by the arrows VWR (Van der Waal's radius). Such spherical volume is truncated on planes P which are spaced from the center 0 by amounts (BR–K) corresponding in scalar angstroms to the bond radii (BR) concerned, preferably decreased by a small and desirably constant amount ($k$) which amount ($k$) in the illustrative embodiment is of the order of 0.05 scalar angstrom units.

At the centers of the planes of truncation P of the rigid units A, B, C, etc., there are provided sockets S (hereinafter more fully described in connection with FIGS. 5a–7) and the juxtaposed walls of the faces of adjacent units surrounding such sockets are preferably somewhat relieved, for example by forming them on a conical angle C°, to permit limited flexure of the connector means 11a–11c.

Each connector element 11a (FIGS. 1 and 2) is formed of tough rubbery material so that a direct pull of considerable force, say 10 lbs., will be needed to separate it from the cooperating female member 12 (FIGS. 5a–5b). In the illustrative embodiment each connector 11a (and also each modified element 11b and 11c) is made of polyurethane elastomer, durometer 95, which is a strong rubber-like material and yet resilient and flexible, especially in small diameters. In the preferred form the atoms are 0.028″ apart and the faces have a 4° angle. Especially when using the narrow waisted flexible link 11b (FIGS. 1 and 3) the link can be flexed to represent a variation in bond angle of up to plus or minus 8 degrees. The distortion may be maintained by inserting wedges W (FIG. 1) between the juxtaposed faces joined by the connector. When no deviation, or a minimum deviation, from linearity is desired then the stiffer, less readily flexed links 11a or 11c may be used. It will be appreciated that while the polyurethane rubber is preferred, other materials, and especially other tough rubbery materials, may be employed within the broader scope of the invention.

Turning now to FIG. 2, the link 11a there shown comprises a generally cylindrical atom-spacing section 20 having at its ends integrally formed male fastener elements 21 of less diameter than the spacing section 20, the spacing section 20 being about one quarter inch long and about 0.4 inch in diameter, and the male fastener elements 21 having fastening grooves 22 adjacent the spacing section and having retaining sections 23 of greater diameter than said grooves lying at the opposite sides of said grooves from said spacing section, and having tapered ends 24 lying beyond said retaining section.

Preferably the spacing sections 20 are made in three different lengths, a standard length to space the atom units in accordance with their normal covalent bond radii, a length about 0.05 scalar angstrom units shorter to adapt standard units to represent different atoms or conditions to some extent, and a length about 0.08 scalar angstrom units longer than the standard length for the same purpose. In terms of scalar angstrom units, therefore, the preferred proportions are as set forth in Table 2.

TABLE II

*Preferred proportions for unit 11a in scalar angstrom units*

| Reference | Item | Dimension |
| --- | --- | --- |
| 20 | Spacing section diameter | 0.8 |
| 20 | Spacing section length | 0.42–0.47–0.55 |
| 21 | Male fastener element width. | 0.19 |
| 22 | Groove width | 0.06 |
| 22 | Groove diameter | 0.63 |
| 23 | Retaining section width | 0.04 |
| 23 | Retaining section diameter | 0.69 |
| 24 | End taper angle, degrees | 30 |

Turning to FIG. 3, the unit 11b there shown is the same as that of FIG. 2, except that it is provided with a narrowed waist section 25 formed centrally of the spacing section 20 to increase its flexibility. While the dimensions of this narrow waist may be varied depending on the nature of the rubbery material and the scale of sizes chosen, in the illustrative embodiment, employing the polyurethane rubber, the narrow waist portion has a diameter of about 0.5 scalar angstrom units and a length or width of about 0.07 scalar angstroms.

The male connectors of FIGS. 2 and 3 are adapted to cooperate with any of the female connector elements of FIGS. 5a through 7. As is shown in FIGS. 5a and 5b, each socketed female connected member 12 comprises a substantially rigid female fastener element F, of a diameter to firmly engage in the groove 22 of the cooperating male fastener element. This element F preferably has its entry edge E rounded off as indicated, to facilitate entry thereinto of the male fastener element. Such rounding off, in the illustrative embodiment, may be on a radius of about 0.015 inch. Preferably the other edge of the fastener element F is left as a relatively sharp edge, i.e. merely smoothed on about a 0.005 inch radius. Each fastener member 12 also has a cylindrical socket S concentric to the fastening flange F and of a diameter to snugly surround one end of the spacing section 20, the socket S being of a depth, measured from its mouth edge, about equal to half the length of the spacing section 20 minus an amount about equal to the radius of the spacing section 20 times the tangent of the angle C° which is an angle of about 4° in the illustrative embodiment.

With this arrangement when the socketed female member 12 is engaged with the male fastener element and adjacent cylindrical spacing section, as shown in FIG. 1 and indicated by the broken lines in FIG. 2, the cylindrical surfaces of the socket S and spacing section 20 engage so as to hold the male and female fastener elements in alignment and insure that their separation can be effected only by components of force applied longitudinally thereto. By this arrangement the cylindrical walls largely support any bending stresses, tending to support long chains of the atom unit without undesirable sagging; the cylindrical engagement allows the desired flexing of the narrow waist 25, FIG. 3, and wedging thereof, without applying very much separating force to the fastening elements; and yet the elements are rather readily separated by a direct longitudinal pull, or by rocking two adjacent atom units so that their conical faces abut at one side and then using said abutment as a fulcrum so that further bending force applied to the atom is transferred into longitudinal force for effecting separation thereof. In this connection it will be noted also that the cylindrical sections of the socket S and spacing portion 20 are effective to support all bending forces which are themselves insufficient to bend the juxtaposed faces of the atom units into contact with each other, and that it is only when this condition has been attained, and additional force is applied over the fulcrum thus provided, that a longitudinal disengagement is effected.

The male connector member 11c (FIGS. 4a and 4b) is the same as that of FIG. 2, except that its cylindrical spacing section is provided with a spline or key means 40 which, with the cooperating spline or key means 41 or 42 (FIG. 6 or 7), constitutes means for securing the atom units in predetermined positions of rotation and for restraining rotation of the female member and its associated atom unit, from such predetermined position.

In the preferred form shown in FIGS. 4a and 4b, the spline means 40 is in the form of a resilient key, while the spline means 41 of FIG. 6 is in the form of a sharp cornered (e.g. .005" radius) keyway, so that the parts interlock in a fashion which effectively resists any rotation of adjacent atoms keyed to the spline by such means 41. As indicated in Table I, such a non-rotatable bond is desirably used on all oxygen atoms, on the double bond socket of ethylenic carbon-atoms, on the ring sockets of aromatic carbon and nitrogen atoms for 5 member rings and of nitrogen atoms for 6 membered rings, and on all sockets of amide nitrogen and amide carbon atoms, and on the triple bond socket of the acetylenic carbon atoms. In the case of tetrahedral carbon atoms as shown in FIG. 7, the sockets are provided with three keyways spaced 120° apart, which keyways have their edges rounded as indicated at r in FIG. 7 (in the illustrative embodiment on a radius of about 0.015", equivalent to about 0.03 scalar angstrom units). With this construction rotation of the so keyed unit is restrained so that any accidental rotation thereof is normally prevented, but by application of sufficient force it is possible to rotate the bond away from one keyway position 42 and to then turn the unit until the key 40 snaps into the next keyway position 42, thus simulating the three-fold rotational potential characteristic of carbon-to-carbon bonds of the tetrahedral carbon atoms. When free rotation is desired, as in carbon-hydrogen bonds, a link of the FIG. 2 or FIG. 3 type may be used with the tetrahedral carbon atom, and the absence of the spline 40 permits the free rotation, notwithstanding the presence of recesses 42 in the socket walls of the tetrahedral atom unit. The spline elements 40 and 41, and one of the spline elements 42, are of course so oriented as to lock the atoms in predetermined positions of rotation. In the illustrative embodiment the elements 41, and one element 42, for all atom faces provided therewith are oriented so that the radii to the centers thereof lie parallel to the edges between the truncated faces of the units.

As above indicated, because of the versatility of the links provided by the present invention, a maximum number of structures can be achieved with nearly a minimum number of different atom units. The ability to alter and maintain a bond angle up to a variation of 8° or so and to alter bond length enable a single atom unit to be used in a variety of configurations. Thus the number of different units may be kept relatively low to minimize confusion on the part of the user and to remind him that bond distances and angles have some variations even in similar structures. As indicated in phantom in FIG. 1, female inserts 12 (see FIG. 5a) may be made available as separate elements, which can be cemented into bored and counterbored wooden bodies WB, or into other hand made bodies, which of course will be formed to proper dimensions, to represent special atoms not provided for in the factory-fabricated set. In addition specialized groups of atoms occurring frequently, such as the amide group, and the purine, pyrimidine, imidazole, and benzene rings, may be made available as permanently assembled units or as one-piece units assemblably equivalent to a builtup sub-assembly of units, or to a single atom unit, in forming larger interconnected structures.

The hydrogen bond hydrogens, as is typified at A–1 in FIG. 1, may have the axes of the barb members in their concaved faces inclined at an angle of 17° to the axis 0—0 as shown, for representing non-linear hydrogen bonding, or may have their concaved faces concentric with the axis 0—0, FIG. 1, for representing linear hydrogen bonded hydrogen. The barb-connector BC may take various forms, and the female apertures FA for cooperating with them may be correspondingly formed, it being advantageous that the latter be of a form not materially altering the spherical nature of the oxygen, nitrogen, or fluorine atom surface to which they are applied. In the illustrated form, which is presently preferred, the barb connector BC may comprise a substantially square shank about 0.05" on a side, carrying three parallel T-head members each about 0.03" thick, 0.05" x 0.10" in plan, and with their opposed faces spaced apart by about 0.07"; and the female apertures FA (FIGS. 1 and 9) may be of rectangular form sized to permit passage of the T-heads therethrough and rotation into locking position therebeyond, in an atom wall having a thickness to cooperate with the spacing between the barbs as shown in FIG. 1. The female apertures FA are suitably located in the spherical surface concerned, e.g. the nitrogen cap NC (FIG. 1) may carry a single axially aligned member FA the single bonded oxygen may carry three rows of the apertures arranged as in FIG. 9, the center row being symmetrical between the two truncated faces and the several apertures FA being suitably spaced on the spherical surface, say by 15 degrees of arc, with respect to one another. When the double-bond oxygen atom is provided with spherically indented sides in known manner, the pattern of elements FA in its residual spherical surface preferably is oriented in the same way with respect to said indented sides as it is with respect to the truncated faces of the single bond oxygen atoms.

The "style" data and other data given above, and the Van der Waal's radii, covalent bond radii, bond angles, etc., set forth in Table III for more frequently used atoms, for example, are typical of the data necessary to prepare various sets of units for molecular models according to the present invention. Instances in which special provisions may be made to reduce the number of different units required, and a suitable color code for aiding in differentiating the elements represented by the various atom units, are also set forth in Table III.

TABLE III

*Dimensional and other data pertinent to space-filling molecular models*

[Radii in scalar angstrom units]

HYDROGEN ATOMS—WHITE

| Item No. | Van der Waal's Radius | Covalent Radius | Bond Angles | Comment and Other Data |
|---|---|---|---|---|
| 1 | 1.00 | 0.33 | | Single bond (elastic). |
| 2 | 1.00 | 0.33 | | Linear hydrogen bond.[a] |
| 3 | 1.00 | 0.33 | | Non-linear H-bond 17° angle.[a] |

OXYGEN ATOMS—RED

| 4 | 1.35 | 0.66 | 110° | Single bonds. |
| 5 | 1.35 | 0.57 | | Double bond. |
| 6 | 1.35 | 0.57 | | Double bond, 2-sides indented.[b] |

NITROGEN ATOMS—BLUE

| 7 | (1.25) | 0.70 | 109°31' | Tetrahedral. |
| 8 | 1.45 | 0.70 | 109°30' | Amino. |
| 9 | 1.70 | (c) | 120° | Aromatic, 6-member ring.[d] |
| 10 | 1.45 | (e) | (f) | Amide.[g] |
| 11 | 1.70 | (h) | (i) | Aromatic, 5-member ring.[j] |

CARBON ATOMS—BLACK

| 12 | 1.50 | (k) | (l) | Amide.[m] |
| 13 | (1.25) | 0.77 | 109°30' | Tetrahedral. |
| 14 | 1.60 | (n) | (o) | Ethylenic, double-bond. |
| 15 | 1.60 | (p) | 180° | Acetylenic, triple-bond. |
| 16 | 1.70 | (h) | (i) | Aromatic, 5-member ring.[j] |
| 17 | 1.70 | (e) | 120° | Aromatic, 6-member ring.[d] |
| 18 | 1.70 | | | Special for purine ring. |

SULPHUR ATOMS—DEEP YELLOW

| 19 | 1.70 | 1.04 | 104° | Digonal. |

PHOSPHORUS—PURPLE

| 20 | (1.50) | 0.96 | 109°30' | Tetrahedral. |

HALOGENS—LIGHT, MEDIUM, MEDIUM DARK, AND DARK GREEN

| 21 | 1.80 | 0.99 | | Chlorine, Tapers—equator to face—55°. |
| 22 | 1.95 | 1.14 | | Bromine, Tapers—equator to face—55°. |
| 23 | 2.15 | 1.35 | | Iodine, Tapers—equator to face—55°. |

METALS (Fe, Co, Ni, Cu) FOR CHELATES—SILVER

| 24 | 1.70 | 1.32 | 90° (all) | For covalent octahedral bonds. |
| 25 | 1.46 | 1.32 | 90° (all) | For ionic octahedral bonds. |

ADAPTATIONS

| 26 | Tetrahedral Sulfur | Can use No. 20 (P) with −0.05 angstrom link or No. 13 (C) with +0.08 angstrom link. |
| 27 | Tetrahedral Silicon | |

[a] Indentation radius 1.35 angstroms about a center 1.66 angstroms from spherical center of hydrogen atom.
[b] Typical indentations on radii of 1.15 angstroms about centers spaced laterally about 2.2 angstroms from spherical center of oxygen atom.
[c] 0.69 within ring; 0.73 to atoms outside ring.
[d] No. 9 and No. 17 the same except for color; for aromatic carbon and nitrogen in 6-membered rings such as pyridine and pyrimidine.
[e] 0.60 to amide−C; 0.70 to H−Bond−H; 0.70 to chain−C.
[f] 123° between amide−C and chain−C; 123° between amide−C and H−Bond−H; 114° between chain−C and H−Bond−H.
[g] Will serve as general planar N, e.g. Trigonal−N, N in NO₂, and cap as azo−N.
[h] 0.68 within ring; 0.73 to atoms outside ring.
[i] 108° between double bonds; 126° between single and double bonds.
[j] Nos. 11 and 16 same except for color; for carbon and nitrogen for unsaturated 5-member rings such as imidazole, pyrazole, and C−8 carbon and N−7 and N−9 nitrogens in the purine ring.
[k] 0.72 to amide−N; 0.67 to O; 0.75 to chain−C.
[l] 115° between amide−N and chain−C; 120° between O and chain−C; 125° between O and amide−N.
[m] Will also serve as general planar carbon, e.g. carboxylate carbon.
[n] 0.67 along double bond; 0.73 along single bond.
[o] 125°15' between double and single bonds; 109°30' between single bonds.
[p] 0.60 along triple bond; 0.70 along single bond.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The invention described herein, if patented, may be manufactured and used by or for the Government of the United States for governmental purposes without the payment to me of any royalty thereon in accordance with the provisions of the Act of March 3, 1863 as amended (35 USC 266).

I claim:

1. A chemical model comprising:
    (a) a first unit representing an atom,
    (b) said first unit being substantially rigid and having a female fastener socket therein,
    (c) said first unit having a frusto-conical face surrounding said socket and inclined downwardly from its smaller base at an angle of about 4° from a flat plane therethrough,
    (d) a second unit representing an atom and having a frusto-conical face also inclined downwardly from its smaller base at an angle of about 4° from a flat plane therethrough and carrying at its smaller base a male fastener element adapted to detachably engage in said female fastener element,
    (e) said male fastener element having a flexible central portion and being of a length such that when it is assembled with said female fastener socket said conical faces are spaced just sufficiently apart to enable said first unit to rock through an angle of about plus or minus 8° before its conical face rocks into engagement with the conical face of said second unit,
    (f) the rocking engagement of said conical faces limiting the degree of flexure of said male fastener element and affording fulcruming action for converting rocking forces into forces acting axially of said male and female fastener elements for effecting separation thereof.

2. A chemical model according to claim 1 in which said units are hollow closed units having an average density of less than 1 so that said units may be floated in water.

3. A chemical model according to claim 1 one of said units having a concave face and having a barb connector structure projecting from the center of said concave face, a third unit having a female aperture therein sufficiently deep to receive said barb connector, said barb connector and female aperture being non-circular and relatively rotatable for interlocking engagement, said barb connector having a plurality of connecting elements spaced therealong for selective interlocking engagement in said female aperture to retain said third unit in a selected one of a plurality of differently spaced relations to said second unit.

(References on following page)

References Cited by the Examiner

UNITED STATES PATENTS

| | | | |
|---|---|---|---|
| 2,308,402 | 1/43 | Taylor | 35—18.5 |
| 2,882,617 | 4/59 | Godfrey | 35—18.5 |
| 2,920,400 | 1/60 | Subluskey | 35—18.5 |
| 2,942,356 | 6/60 | Weintraub | 35—18.5 |
| 2,942,357 | 6/60 | Adler et al. | 35—18.5 |
| 2,953,860 | 9/60 | Adler et al. | 35—18.5 |
| 3,080,662 | 3/63 | Brumlik | 35—18.5 |

FOREIGN PATENTS 1,101,229  4/55  France.

JEROME SCHNALL, *Primary Examiner.*

L. SMILOW, LAWRENCE CHARLES, *Examiners.*